(12) United States Patent
Tu et al.

(10) Patent No.: US 12,058,304 B2
(45) Date of Patent: Aug. 6, 2024

(54) AUGMENTED REALITY DISPLAY DEVICE AND METHOD

(71) Applicant: Acer Incorporated, New Taipei (TW)

(72) Inventors: Tsung-Wei Tu, New Taipei (TW); Yi-Jung Chiu, New Taipei (TW); Shih-Ting Huang, New Taipei (TW); Yen-Hsien Li, New Taipei (TW)

(73) Assignee: Acer Incorporated, New Taipei (TW)

( * ) Notice: Subject to any disclaimer, the term of this patent is extended or adjusted under 35 U.S.C. 154(b) by 204 days.

(21) Appl. No.: 17/715,059

(22) Filed: Apr. 7, 2022

(65) Prior Publication Data

US 2022/0400247 A1 Dec. 15, 2022

(30) Foreign Application Priority Data

Jun. 11, 2021 (TW) ................................. 110121308

(51) Int. Cl.
*H04N 13/344* (2018.01)
*G02B 27/01* (2006.01)
*G06T 19/00* (2011.01)
*H04N 13/383* (2018.01)
*H04N 13/398* (2018.01)

(52) U.S. Cl.
CPC ....... *H04N 13/344* (2018.05); *G02B 27/0172* (2013.01); *G02B 27/0176* (2013.01); *G06T 19/006* (2013.01); *H04N 13/383* (2018.05); *H04N 13/398* (2018.05); *G02B 2027/0134* (2013.01); *G02B 2027/0154* (2013.01)

(58) Field of Classification Search
CPC .. H04N 13/344; H04N 13/383; H04N 13/398; G02B 27/0172; G02B 27/0176; G02B 2027/0134; G02B 2027/0154; G02B 27/0093; G02B 30/34; G02B 2027/0181; G06T 19/006
See application file for complete search history.

(56) References Cited

U.S. PATENT DOCUMENTS

| 2016/0163108 A1 | 6/2016 | Kim |
| 2017/0099482 A1* | 4/2017 | Fateh ................. G02B 27/0172 |
| 2019/0271846 A1 | 9/2019 | Fujimaki et al. |

(Continued)

FOREIGN PATENT DOCUMENTS

| CN | 105704479 | 6/2016 |
| JP | 2021063934 A * | 4/2021 |

(Continued)

*Primary Examiner* — Michael Lee
(74) *Attorney, Agent, or Firm* — JCIPRNET

(57) ABSTRACT

An augmented reality display device including a virtual image display and a controller is provided. The virtual image display is configured to provide a left eye virtual image and a right eye virtual image to a left eye and a right eye of a user, respectively. The controller is electrically connected to the virtual image display, and is configured to command the virtual image display to display a left eye virtual mark and a right eye virtual mark, corresponding to a real mark in space, in the left eye virtual image and the right eye virtual image, respectively, and calculate an interpupillary distance between the left eye and the right eye according to a deviation of the left eye virtual mark with respect to the real mark and a deviation of the right eye virtual mark with respect to the real mark.

18 Claims, 10 Drawing Sheets

(56) References Cited

U.S. PATENT DOCUMENTS

| | | | |
|---|---|---|---|
| 2020/0186775 A1 | 6/2020 | Lin et al. | |
| 2021/0235063 A1* | 7/2021 | Yasuda | H04N 13/327 |
| 2021/0357024 A1* | 11/2021 | Li | G06T 7/60 |
| 2022/0286658 A1* | 9/2022 | Tan | H04N 13/156 |

FOREIGN PATENT DOCUMENTS

| | | |
|---|---|---|
| TW | 201447372 | 12/2014 |
| TW | I591378 | 7/2017 |
| TW | 201800802 | 1/2018 |
| TW | I704376 | 9/2020 |
| WO | 2019149175 | 8/2019 |

\* cited by examiner

AUGMENTED REALITY DISPLAY DEVICE AND METHOD

CROSS-REFERENCE TO RELATED APPLICATION

This application claims the priority benefit of Taiwan application serial no. 110121308, filed on Jun. 11, 2021. The entirety of the above-mentioned patent application is hereby incorporated by reference herein and made a part of this specification.

BACKGROUND

Technical Field

The disclosure generally relates to a display device and method, and in particular, to an augmented reality display device and method.

Description of Related Art

Interpupillary distance (IPD) greatly differs from person to person. For those with a large IPD, their stereoscopic perception when they view a normal object is stronger than those with a small IPD. Accordingly, when using three-dimensional display products such as augmented reality displays, virtual reality displays, or three-dimensional televisions, it is necessary to enter the IPD of a viewer or a user into the software when the stereo vision is generated so as to obtain a three-dimensional size and perception which is closer to reality. In particular, in the application of augmented reality, a virtual image and an actual object have to be superimposed. If the IPD of the user is not entered, there may be an error when the virtual image and the actual object are superimposed. There also may be an uncertainty of the grid distortion correction, which causes different perception for people with a large or small IPD.

The IPD is usually detected or adjusted by scanning and detecting a human face contour or by using a mechanism adjustment device. The former is mainly achieved through an external device, which makes it a passive process. The latter may be achieved through an internal device of the hardware itself. However, when adjusting the actual IPD of the hardware, the user only observes a relative value of the optical quality. In other words, the user does not know whether the IPD is adjusted to the most ideal position, and there may be a certain deviation amount. If a source of entering the IPD required for generating the stereo vision at the back end is from the hardware adjusting device, the deviation amount may become an issue. The deviation may result in an erroneous stereo vision position projected to the user when the stereo vision is generated at a later stage.

SUMMARY

The disclosure is directed to an augmented reality display device which can calculate an interpupillary distance (IPD).

The disclosure provides an augmented reality display method which can calculate an interpupillary distance (IPD).

An embodiment of the disclosure provides an augmented reality display device including a virtual image display and a controller. The virtual image display is configured to respectively provide a left eye virtual image and a right eye virtual image to a left eye and a right eye of a user. The controller is electrically connected to the virtual image display and is configured to command the virtual image display to respectively display a left eye virtual mark and a right eye virtual mark corresponding to a real mark in space in the left eye virtual image and the right eye virtual image and calculate an interpupillary distance between the left eye and the right eye according to a deviation of the left eye virtual mark relative to the real mark and a deviation of the right eye virtual mark relative to the real mark, and the controller commands the virtual image display to display a correct left eye virtual image and a correct right eye virtual image according to the calculated interpupillary distance.

An embodiment of the disclosure provides an augmented reality display method including the following. A left eye virtual image and a right eye virtual image are respectively provided to a left eye and a right eye of a user. The left eye virtual image has a left eye virtual mark corresponding to a real mark in space, and the right eye virtual image has a right eye virtual mark corresponding to the real mark. An interpupillary distance between the left eye and the right eye is calculated according to a deviation of the left eye virtual mark relative to the real mark and a deviation of the right eye virtual mark relative to the real mark. A correct left eye virtual image and a correct right eye image are displayed according to the calculated interpupillary distance.

In the augmented reality display device and the augmented reality display method of the embodiments of the disclosure, the left eye virtual mark and the right eye virtual mark corresponding to the real mark in space are respectively displayed in the left eye virtual image and the right eye virtual image. The interpupillary distance between the left eye and the right eye is calculated according to the deviation of the left eye virtual mark relative to the real mark and the deviation of the right eye virtual mark relative to the real mark. Accordingly, the augmented reality display device and method of the embodiments of the disclosure can calculate the interpupillary distance so as to correctly display three-dimensional images.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
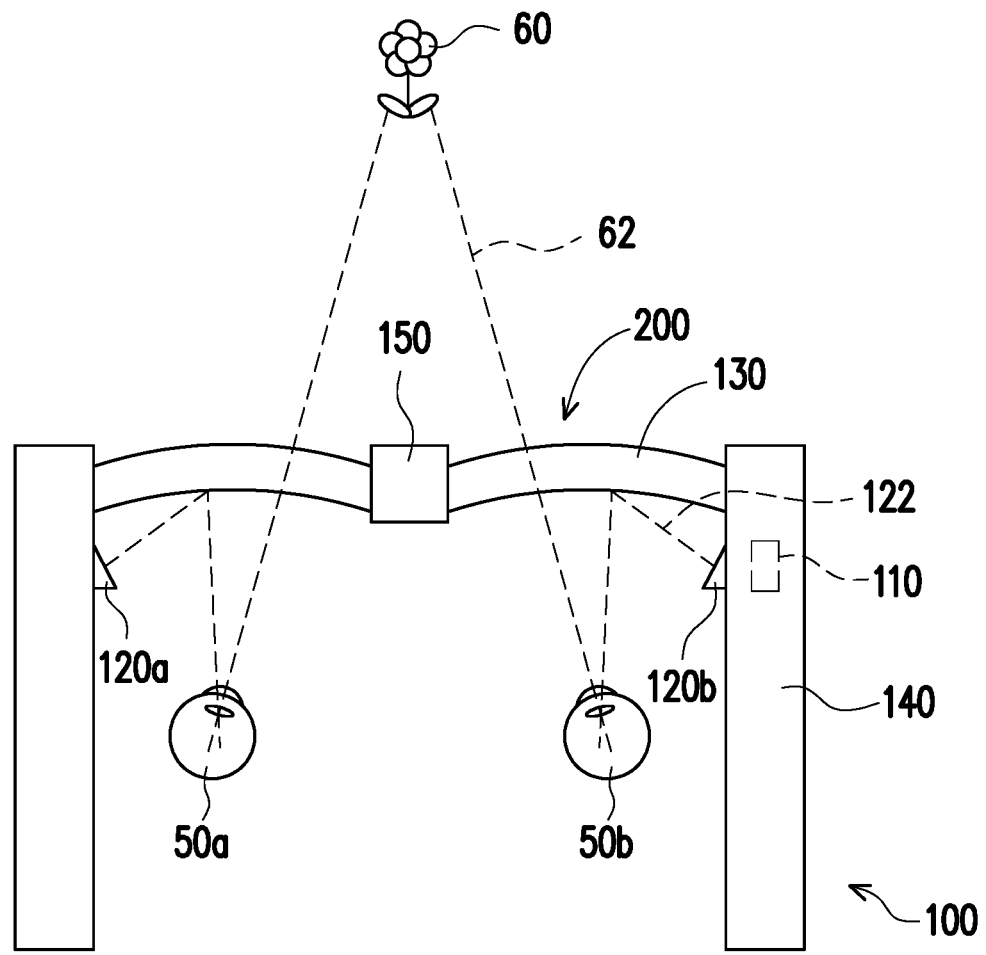
FIG. 1 is a schematic diagram of a structure of an augmented reality display device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram of a structure of an augmented reality display device according to an embodiment of the disclosure. Referring to FIG. 1, an augmented reality display device 100 of the embodiment includes a virtual image display 200 and a controller 110. The virtual image display 200 is configured to respectively provide a left eye virtual image and a right eye virtual image to a left eye 50a and a right eye 50b of a user. In the embodiment, the virtual image display 200 includes a left eye display 120a, a right eye display 120b, and at least one light-guiding element 130 (for example, two light-guiding elements 130 in the embodiment). Each of the left eye display 120a and the right eye display 120b is configured to provide an image beam 122. The light-guiding elements 130 respectively guide the image beam 122 on the left and the image beam 122 on the right to the left eye 50a and the right eye 50b of the user so that the left eye 50a and the right eye 50b respectively view the left eye virtual image and the right eye virtual image. The left eye virtual image and the right eye virtual image are both virtual images appearing in front of the left eye 50a and the right eye 50b. In the embodiment, the left eye display 120a and the right eye display 120b may include a display panel, a light valve, a lens, an illumination light source, or the combinations thereof. Accordingly, the left eye display 120a and the right eye display 120b may serve as projectors configured to project the image beam 122. The display panel is, for example, an organic light-emitting diode display panel, a liquid-crystal display panel, or other suitable display panels. The light valve is, for example, a liquid-crystal-on-silicon panel (LCOS panel), a digital micro-mirror device (DMD), or other spatial light modulators.

In addition, the light-guiding elements 130 may allow a light 62 of an object 60 from an external environment to pass through and transmit to the left eye 50a and the right eye 50. Hence, the user views the object 60 in the external environment through the light-guiding elements 130. Accordingly, the user can simultaneously view the left eye virtual image, the right eye virtual image, and the object 60 in the external environment to achieve an augmented reality effect.

In the embodiment, the light-guiding elements 130 may be any optical elements which can guide the image beam 122 to the eyes, such as a lens with a diffraction microstructure on the surface, a light-guiding plate, a prism, a view-through mirror, a light-guiding plate including a micro-reflection mirror or other optical elements. In the embodiment, the augmented reality display device 100 further includes a glasses frame 140. The left eye display 120a, the right eye display 120b, and the light-guiding elements 130 are disposed on the glasses frame 140.

Figure 2:
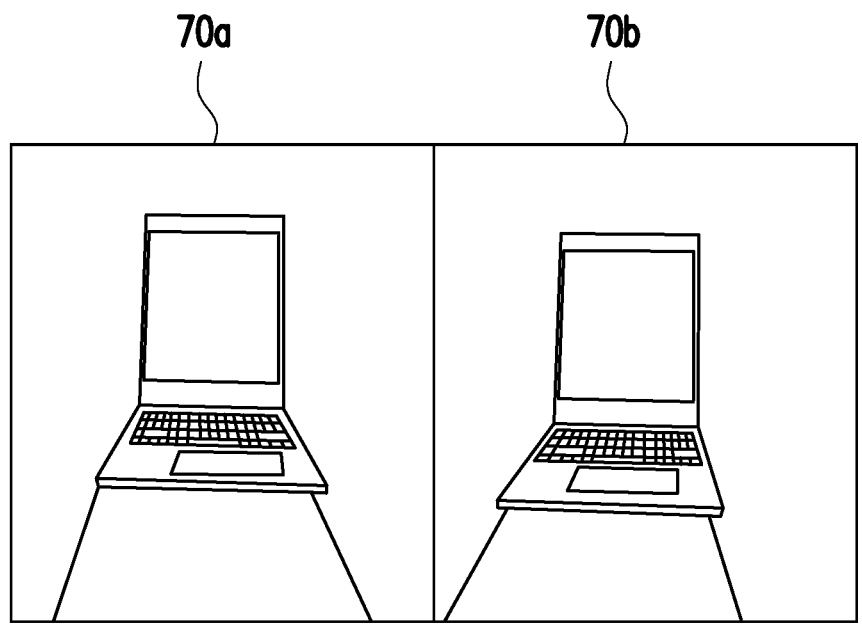
FIG. 2 illustrates images of different viewing angles generated to a left eye and a right eye due to pixel deviation amounts of a left eye virtual image and a right eye virtual image.
Figure 3:
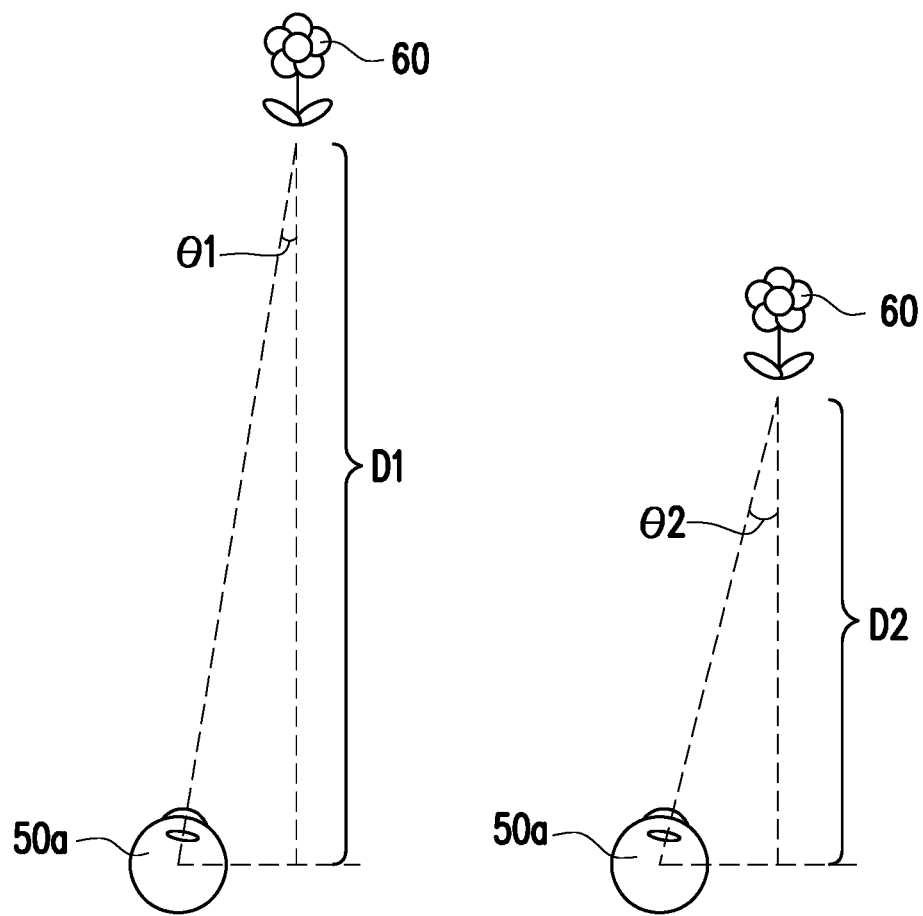
FIG. 3 is a diagram illustrating the different viewing angles generated to a left eye when an object is at two different vergence distances (VD).

FIG. 2 illustrates images of different viewing angles generated to the left eye and the right eye due to pixel deviation amounts of the left eye virtual image and the right eye virtual image. FIG. 3 is a diagram illustrating the different viewing angles generated to the left eye when an object is at two different vergence distances. As shown in FIG. 2, the viewing angles are different in a left eye virtual image 70a and a right eye virtual image 70b so that after the left eye 50a and the right eye 50b respectively view the left eye virtual image 70a and the right eye virtual image 70b, the images are combined into a three-dimensional visual image in the user's brain. As shown in FIG. 3, different vergence distances D1 and D2 respectively correspond to different viewing angles θ1 and θ2. The pixels per degree (PDD) of the left eye display 120 and the right eye display 120b are known, so the viewing angles are able to be calculated according to the numbers of deviated pixels of the left eye virtual image 70a and the right eye virtual image 70b. The number of pixels per degree refers to the number of deviated pixels of a virtual image when a viewing angle deviates one degree. When a line connecting the left eye 50a and the right eye 50b is directly perpendicular to the front, a number of deviated pixels ΔPixel and a deviated viewing angle Δ(α/2) satisfy the following equation:

$$\Delta Pixel = PPD \times \Delta(\alpha/2) \qquad \text{Equation 1}$$

PPD refers to the number of pixels per degree, and Δ(α/2) is, for example θ2 minus θ1 in FIG. 3.

Furthermore, a viewing angle α/2 and an interpupillary distance (IPD) satisfy to the following equation:

$$\frac{\alpha}{2} = \tan^{-1}\left(\frac{0.5 \times IPD}{VD}\right) \qquad \text{Equation 2}$$

Figure 4:
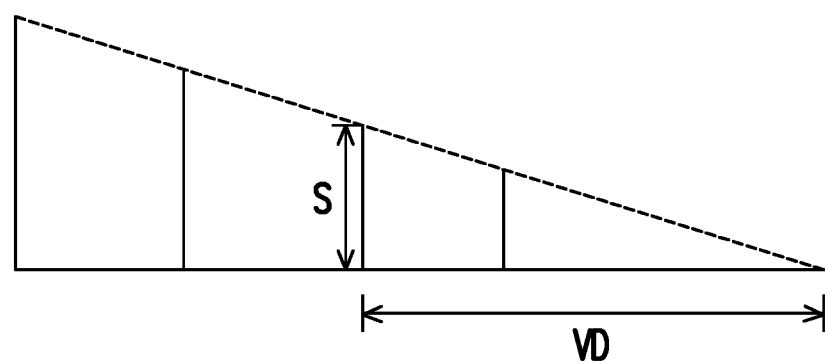
FIG. 4 is a diagram illustrating that a size of a virtual object viewed by a human eye varies at different vergence distances (VD).

In the equation, IPD is the interpupillary distance, which is a distance between the pupil of the left eye 50a and the pupil of the right eye 50b. VD is the vergence distance, which is a distance from a point where the sight lines of the two eyes intersect to a midpoint between the two eyes. As shown in Equation 2, if the viewing angle α/2 and the vergence distance VD are known, the interpupillary distance IPD may be obtained. On the other hand, if the interpupillary distance IPD set in the virtual image display 200 is incorrect and has a deviation value from an actual interpupillary distance, a depth (i.e. the vergence distance VD) of a virtual object in the virtual image perceived when the left eye 50a and the right eye 50b view the left eye virtual image and the right eye virtual image may change and thus is inaccurate. FIG. 4 is a diagram illustrating that a size S of a virtual object viewed by a human eye varies at different vergence distances (VD). Hence, the virtual image may be incorrectly displayed. For example, the size may be incorrectly displayed. In addition, the depth of the virtual object may be incorrect. Accordingly, how to determine the interpupillary distance IPD of the user is related to correctly displaying the virtual image.

Figure 5A:
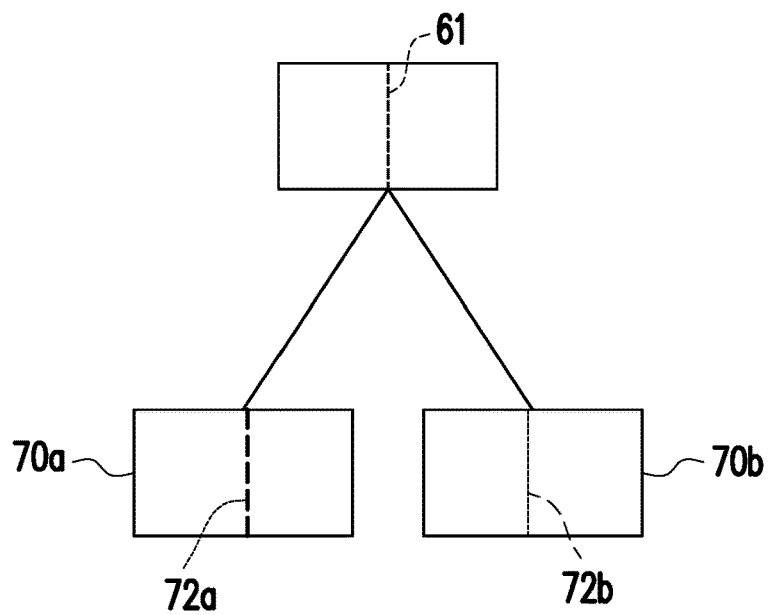
FIG. 5A is a schematic diagram illustrating a left eye virtual mark, a right eye virtual mark, and a real mark in space generated by the augmented reality display device in FIG. 1.
Figure 5B:
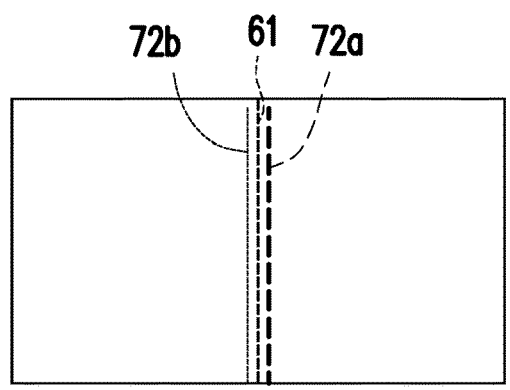
FIG. 5B is a diagram illustrating the positions of a left eye virtual mark, a right eye virtual mark, and a real mark viewed by a user when an interpupillary distance set by the augmented reality display device is incorrect.
Figure 5C:
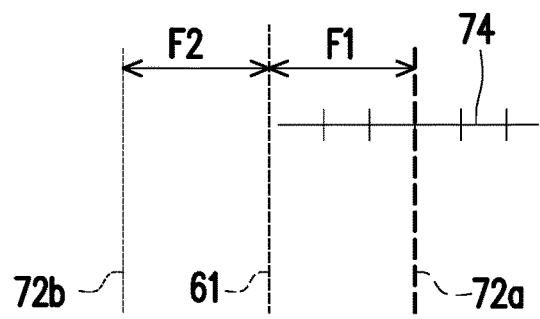
FIG. 5C is a detailed schematic diagram illustrating the virtual image and the real mark viewed by the user in the case of FIG. 5B.

FIG. 5A is a schematic diagram illustrating the left eye virtual mark, the right eye virtual mark, and the real mark in space generated by the augmented reality display device in FIG. 1. FIG. 5B is a diagram illustrating the positions of the left eye virtual mark, the right eye virtual mark, and the real mark viewed by the user when the interpupillary distance IPD set by the augmented reality display device is incorrect. FIG. 5C is a detailed schematic diagram illustrating the virtual image and the real mark viewed by the user in the case of FIG. 5B. Referring to FIG. 1 and FIG. 5A to FIG. 5C, in the embodiment, the controller 110 is electrically connected to the virtual image display 200 and is configured to command the virtual image display 200 to respectively display a left eye virtual mark 72a and a right eye virtual mark 72b corresponding to a real mark 61 in space in the left eye virtual image 70a and the right eye virtual image 70b. The interpupillary distance between the left eye 50a and the right eye 50b is calculated according to a deviation F1 of the left eye virtual mark 72a relative to the real mark 61 and a deviation F2 of the right eye virtual mark 72b relative to the real mark 61. In the embodiment, the controller 110 is configured to calculate a viewing angle of the left eye 50a and a viewing angle of the right eye 50b viewing the real mark 61 according to the number of deviated pixels of the left eye virtual mark 72a relative to the real mark 61 and the number of deviated pixels of the right eye virtual mark 72b relative to the real mark 61 and calculate the interpupillary distance according to the vergence distances and the viewing angles of the left eye 50a and the right eye 50b viewing the real mark 61.

Figure 6:
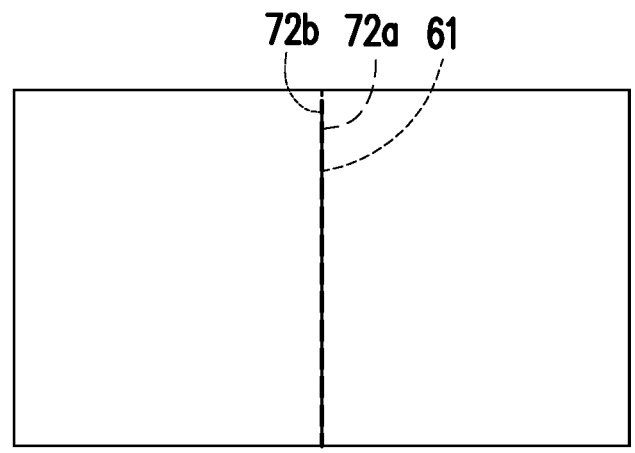
FIG. 6 is a diagram illustrating that the left eye virtual mark, the right eye virtual mark, and the real mark overlap with each other when the virtual image display in FIG. 1 displays a correct left eye virtual image and a correct right eye virtual image.

Specifically, when the interpupillary distance set by the augmented reality display device 100 is incorrect, the user may view the scene as shown in FIG. 5B in which the left eye virtual mark 72a, the right eye virtual mark 72b, and the real mark 61 do not overlap with each other. In the embodiment, the controller 110 is configured to command the virtual image display 200 to display a scale 74 in the left eye virtual image 70a and the right eye virtual image 70b. The displayed scale 74 is, for example, the number of deviated pixels for the user to measure the number of deviated pixels of the left eye virtual mark 72a relative to the real mark 61 by looking at the scale and to measure the number of deviated pixels of the right eye virtual mark 72b relative to the real mark 61 by looking at the scale. In addition, a user interface is provided, and the user may also enter a value (e.g. the number of deviated pixels) of the deviation F1 of the left eye virtual mark 72a relative to the real mark 61 and a value (e.g. the number of deviated pixels) of the deviation F2 of the right eye virtual mark 72b relative to the real mark 61 into the controller 110 on his own through the user interface. Accordingly, the controller 110 may convert the number of deviated pixels into the deviated viewing angle $\Delta(\alpha/2)$ according to Equation 1 and calculate the interpupillary distance IPD according to the viewing angle $\alpha/2$, the known vergence distance VD of the real mark 61 and Equation 2. Then, the controller 110 commands the virtual image display 200 to display the correct left eye virtual image and the correct right eye virtual image according to the calculated interpupillary distance IPD. If the virtual image display 200 displays the left eye virtual mark 72a and the right eye virtual mark 72b, the left eye virtual mark 72a, the right eye virtual mark 72b, and the real mark 61 viewed by human eyes overlap with each other, as shown in FIG. 6. The user interface is, for example, a touch interface, a button, a voice control interface, or any interfaces which the user may use to operate the augmented reality display device.

In another embodiment, it may also be that, instead of displaying the scale 74, the user moves the left eye virtual mark 72a in the left eye virtual image 70a and the right eye virtual mark 72b in the right eye virtual image 70b to a position overlapping with the real mark 61 through the user interface, and the controller 110 records moving distances of the left eye virtual mark 72a and the right eye virtual mark 72b (e.g. the numbers of pixels which the virtual marks move across). The controller 110 calculates the interpupillary distance between the left eye 50a and the right eye 50b according to the moving distances of the left eye virtual mark 72a and the right eye virtual mark 72b.

Or in still another embodiment, the augmented reality display device 100 may further include an adjusting mechanism 150 connected to the left eye display 120a and the right eye display 120b and configured to adjust the position of the left eye display 120a and the position of the right eye display 120b. The adjusting mechanism 150 allows the user to move the left eye virtual mark 72a in the left eye virtual image 70a and the right eye virtual mark 72b in the right eye virtual image 70b to the position overlapping with the real mark 61 by adjusting the position of the left eye display 120a and the position of the right eye display 120b. In addition, the adjusting mechanism 150 is electrically connected to the controller 110, and the controller 110 calculates the interpupillary distance between the left eye 50a and the right eye 50b according to the moving distances of the left eye display 120a and the right eye display 120b. In other embodiments, the augmented reality display device 100 may also omit the adjusting mechanism 150 but, instead, the left eye display 120a and the right eye display 120b may be connected with a part of the glasses frame 140 corresponding to a position between the two eyes.

In an embodiment, the controller 110 is, for example but not limited to, a central processing unit (CPU), a microprocessor, a digital signal processor (DSP), a programmable controller, a programmable logic device (PLD), or other similar devices or the combinations thereof. Furthermore, in an embodiment, each function of the controller 110 may be realized as multiple program codes. The program codes are saved in a memory and executed by the controller 110. Or, in an embodiment, each function of the controller 110 may be realized as one or more electric circuits. The disclosure is not intended to limit how each function of the controller 110 is realized (e.g., as software or hardware).

Figure 7:
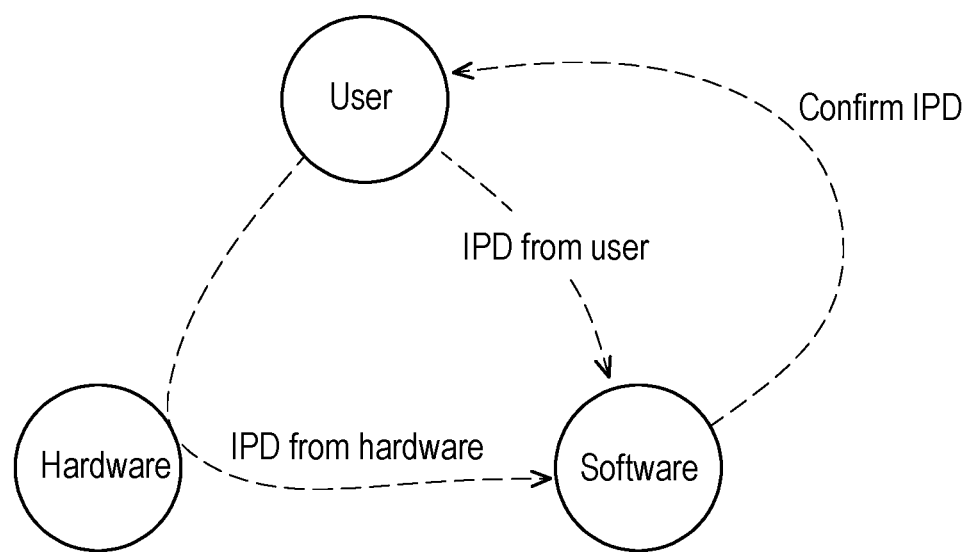
FIG. 7 is a diagram illustrating an interpupillary distance adjustment structure of the augmented reality display device in FIG. 1.

FIG. 7 is a diagram illustrating an interpupillary distance adjustment structure of the augmented reality display device in FIG. 1. Referring to FIG. 1 and FIG. 7, the user may enter the interpupillary distance he knows into a software loaded into the controller 110 through the user interface on his own. If the augmented reality display device 100 has the adjusting mechanism 150 (i.e. the hardware in FIG. 7), an interval between the left eye display 120a and the right eye display 120b may also be adjusted preliminarily through the adjusting mechanism 150, and the adjusting mechanism 150 enters an adjustment result value into the software of the controller 110 to convert the adjustment result value into the interpupillary distance.

Then, the software loaded into the controller 110 executes the steps in FIG. 5A to FIG. 5C and FIG. 6 to confirm the interpupillary distance with the user. That is, as shown in FIG. 5A to FIG. 5C, the user determines whether the left eye virtual mark 72a, the right eye virtual mark 72b, and the real mark 61 overlap with each other.

Figure 8:
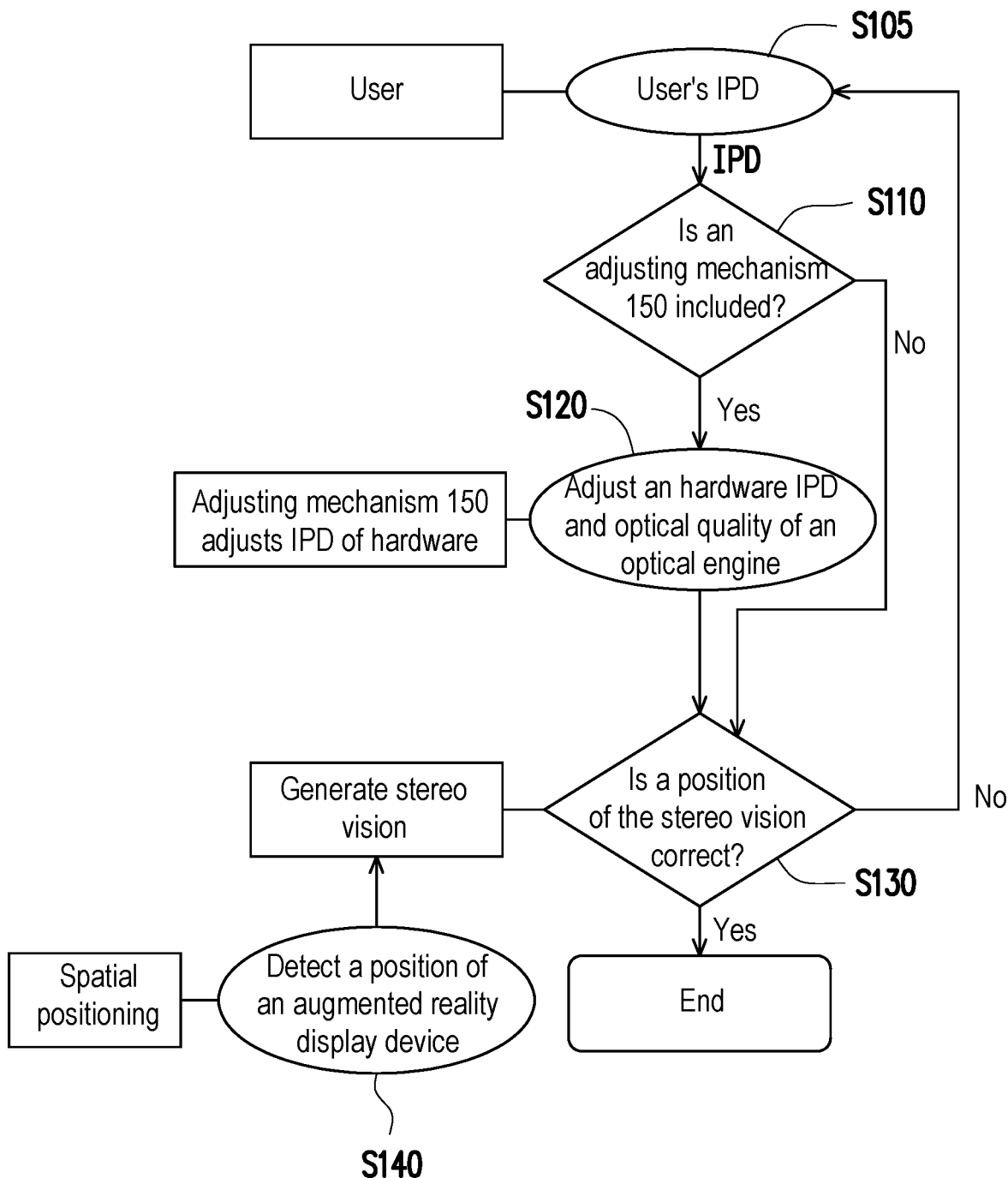
FIG. 8 is a flow chart of a system of the augmented reality display device in FIG. 1.

FIG. 8 is a flow chart of a system of the augmented reality display device in FIG. 1. Referring to FIG. 1 and FIG. 8, regarding a value of the interpupillary distance IPD of the user, step S105 is executed first, the user provides the interpupillary distance IPD through the user interface. Then, step S110 is executed, whether the augmented reality display device 100 includes the adjusting mechanism 150 is determined. If it is determined that the augmented reality display device 100 includes the adjusting mechanism 150, step S120 is executed, an optical quality of an optical engine is adjusted by adjusting the interpupillary distance IPD value through the adjusting mechanism. Then, step S130 is executed. If it is determined that the augmented reality display device 100 does not include the adjusting mechanism 150 in step S110, step S120 is not executed and the process directly proceeds to step S130. In step S130, the steps in FIG. 5A to FIG. 5C and FIG. 6 are executed to confirm the interpupillary distance with the user. That is, as shown in FIG. 5A to FIG. 5C, the user determines whether the left eye virtual mark 72a, the right eye virtual mark 72b, and the real mark 61 overlap with each other. If the determination is yes in step S130, the interpupillary distance value correction in the system is completed. The process ends. If the determination is no in step S130, the process returns to step S105. The user may adjust the interpupillary distance value as the descriptions of FIG. 5A to FIG. 5C and FIG. 6. Furthermore, before the virtual image of stereo vision is generated, the augmented reality display device 100 may be spatially positioned, as shown in S140. Thus, for example, a relative position relation of the augmented reality display device 100 with respect to a real object in space may be obtained. Such relative position relation may be obtained by using a depth sensor, a camera, or an eye tracker. By performing such spatial positioning, the vergence distance VD when viewing the real object 60, a distance from the left eye 50a to the object 60, a distance from the right eye 50b to the object 60, or a distance from any one point to another in real space may be obtained. However, the spatial positioning does not include measurement of a distance of the virtual image.

Figure 9A:
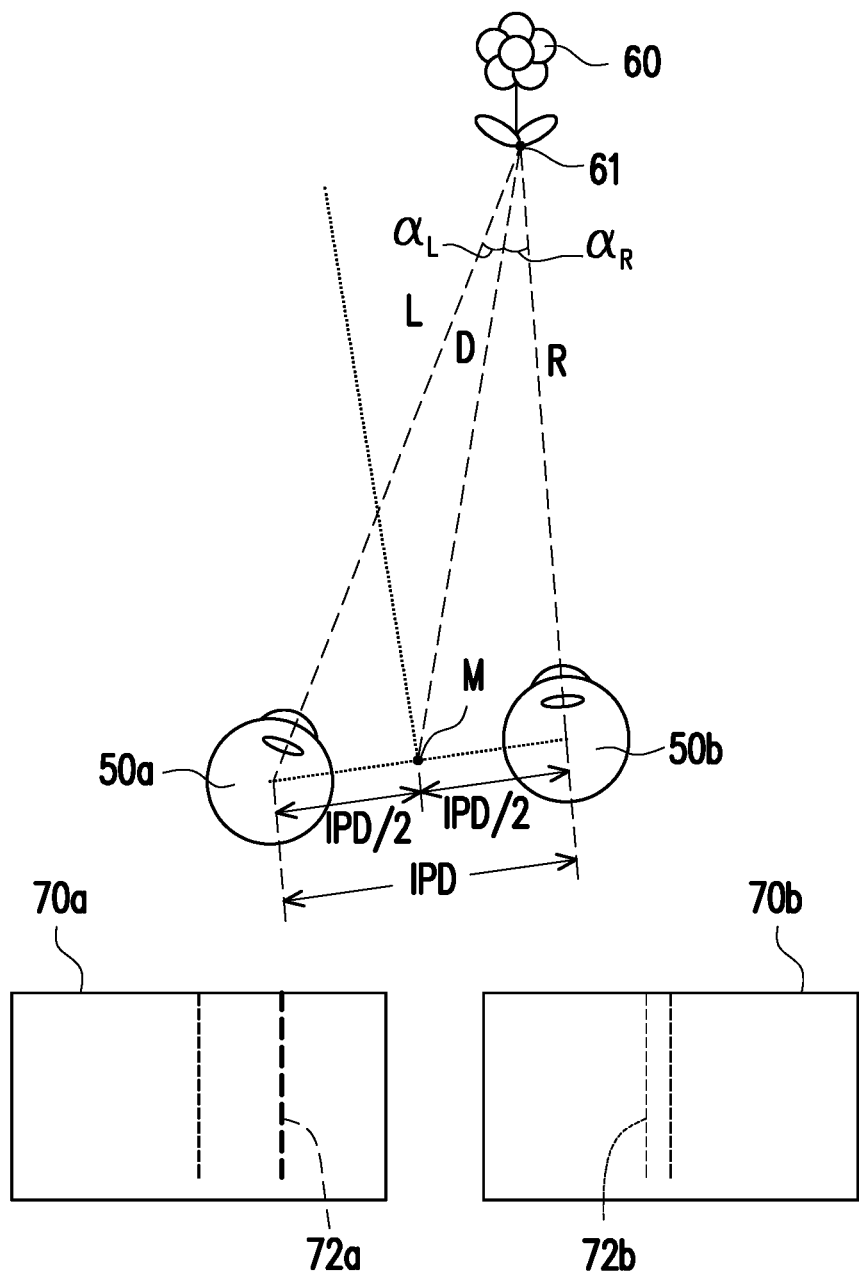
FIG. 9A is a schematic diagram illustrating an application of the augmented reality display device in FIG. 1 when considering the user's dominant eye.
Figure 9B:
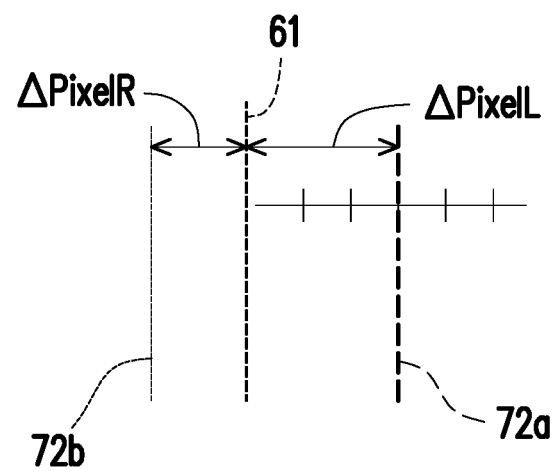
FIG. 9B is a schematic diagram illustrating the positions of the left eye virtual mark, the right eye virtual mark, and the real mark viewed by the user in the application of FIG. 9A.

FIG. 9A is a schematic diagram illustrating an application of the augmented reality display device in FIG. 1 when considering the user's dominant eye. FIG. 9B is a schematic diagram illustrating the positions of the left eye virtual mark, the right eye virtual mark, and the real mark in space viewed by the user in the application of FIG. 9A. Referring to FIG. 1, FIG. 9A, and FIG. 9B, if considering that a human usually has a dominant eye and his/her head may tilt to one side when viewing the object 50 in the external environment, the augmented reality display device 100 may calculate the interpupillary distance by adopting the method below.

In the embodiment, the controller 110 is configured to calculate a left eye viewing angle $\alpha_L$ when the left eye 50a views the real mark 61 according to the number of deviated pixels of the left eye virtual mark 72a relative to the real mark 61 and calculate a right eye viewing angle $\alpha_R$ when the right eye 50b views the real mark 61 according to the number of deviated pixels of the right eye virtual mark 72b relative to the real mark 61. A method for obtaining the number of deviated pixels is the same as the descriptions of FIG. 5A to FIG. 5C and FIG. 6. The number of deviated pixels may be entered by the user watching the scale, or may be obtained from the numbers of pixels the left eye virtual mark 72a and the right eye virtual mark 72b move across as recorded by the software when the user move the left eye virtual mark 72a and the right eye virtual mark 72b to overlap with the real mark 61 through software, or may also be obtained from converting the adjusted distance into the numbers of pixels the left eye virtual mark 72a and the right eye virtual mark 72b move across when the user overlap the left eye virtual mark 72a and the right eye virtual mark 72b with the real mark 61 by adjusting the positions of the left eye display 120a and the position of the right eye display 120b through the adjusting mechanism 150. The equations for conversion among a number $\Delta$PixelL of deviated pixels of the left eye virtual mark 72a, a number $\Delta$PixelR of deviated pixels of the right eye virtual mark 72b, a deviated viewing angle $\Delta\alpha_L$ of the left eye, and a deviated viewing angle $\Delta\alpha_R$ of the right eye are below:

$$\Delta\alpha_L = \frac{\Delta \text{Pixel} L}{PPD} \qquad \text{Equation 3}$$

$$\Delta\alpha_R = \frac{\Delta \text{Pixel} R}{PPD} \qquad \text{Equation 4}$$

Then, the controller 110 is configured to calculate the interpupillary distance IPD according to a distance L from the left eye 50a to the real mark 61, a distance R from the right eye 50b to the real mark 61, a distance D from a midpoint M between the left eye 50a and the right eye 50b to the real mark 61, the left eye viewing angle $\alpha_L$, and the right eye viewing angle $\alpha_R$. The left eye viewing angle $\alpha_L$ is an included angle between a line connecting the left eye 50a and the real mark 61 and a line connecting the midpoint M and the real mark 61, and the right viewing angle $\alpha_R$ o is an included angle between a line connecting the right eye 50b and the real mark 61 and a line connecting the midpoint M and the real mark 61. The equations are below:

$$\cos\alpha_L = \frac{D^2 + L^2 - \left(\frac{IPD}{2}\right)^2}{2DL} \qquad \text{Equation 5}$$

$$\cos\alpha_R = \frac{D^2 + R^2 - \left(\frac{IPD}{2}\right)^2}{2DR} \qquad \text{Equation 6}$$

$$\left(\frac{IPD}{2}\right)^2 = R^2 + L^2 - 2D^2 \qquad \text{Equation 7}$$

The interpupillary distance IPD may be calculated by applying Equation 5 to Equation 7.

Figure 10:
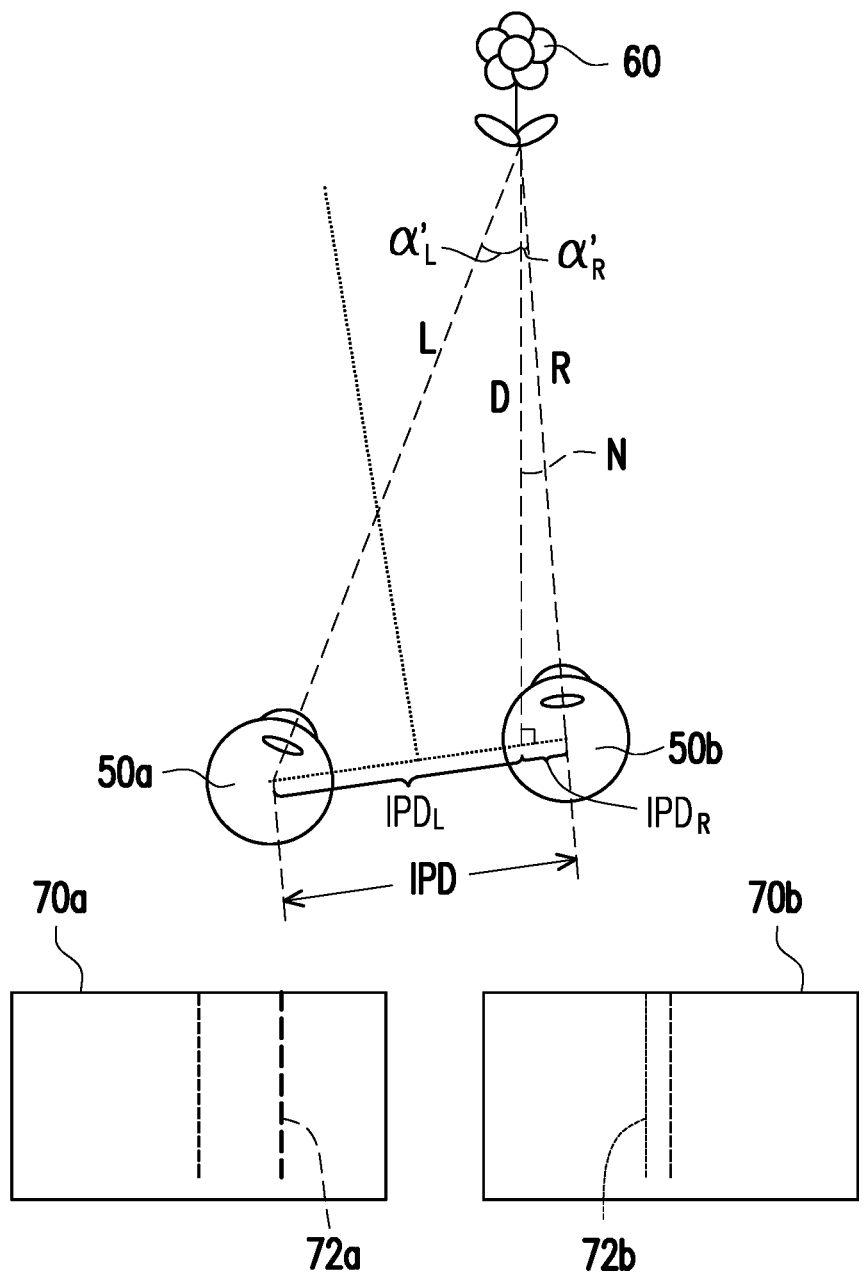
FIG. 10 is a schematic diagram of another calculation method of the application of the augmented reality display device in FIG. 1 when considering the user's dominant eye.

FIG. 10 is a schematic diagram of another calculation method of the application of the augmented reality display device in FIG. 1 when considering the user's dominant eye. Referring to FIG. 1 and FIG. 10, the calculation method in FIG. 10 and the calculation method in FIG. 9A are similar. The difference between the two calculation methods lies in the definitions of the viewing angle. In the embodiment, the controller 110 is configured to calculate a left eye viewing angle $\alpha'_L$ when the left eye 50a views the real mark 61 according to the number $\Delta$PixelL of deviated pixels of the left eye virtual mark 72a relative to the real mark 61 and calculate a right eye viewing angle $\alpha'_R$ when the right eye 50b views the real mark 61 according to the number $\Delta$PixelR of deviated pixels of the right eye virtual mark 72b relative to the real mark 61. The controller 110 is configured to calculate the interpupillary distance IPD according to the distance L from the left eye 50a to the real mark 61, the distance R from the right eye 50b to the real mark 61, a perpendicular distance D from the real mark 61 to a line connecting the left eye to the right eye, the left eye viewing angle $\alpha'_L$, and the right eye viewing angle $\alpha'_R$. The left eye viewing angle $\alpha'_L$ is an included angle between a line connecting the left eye and the real mark 61 and a perpendicular line N from the real mark 61 to the line connecting the left eye and the right eye. The right eye viewing angle $\alpha'_R$ is an included angle between a line connecting the right eye 50b and the real mark 61 and the perpendicular line N. The interpupillary distance IPD is calculated through the equations below:

$$\cos \alpha'_L = \frac{D^2 + L^2 - (IPD_L)^2}{2DL} \quad \text{Equation 8}$$

$$\cos \alpha'_R = \frac{D^2 + R^2 - (IPD_R)^2}{2DR} \quad \text{Equation 9}$$

$$IPD = IPD_L + IPD_R \quad \text{Equation 10}$$

$IPD_L$ is a perpendicular distance from the left eye 50a to the perpendicular line N, and $IPD_R$ is a perpendicular distance from the right eye 50b to the perpendicular line N.

Figure 11:
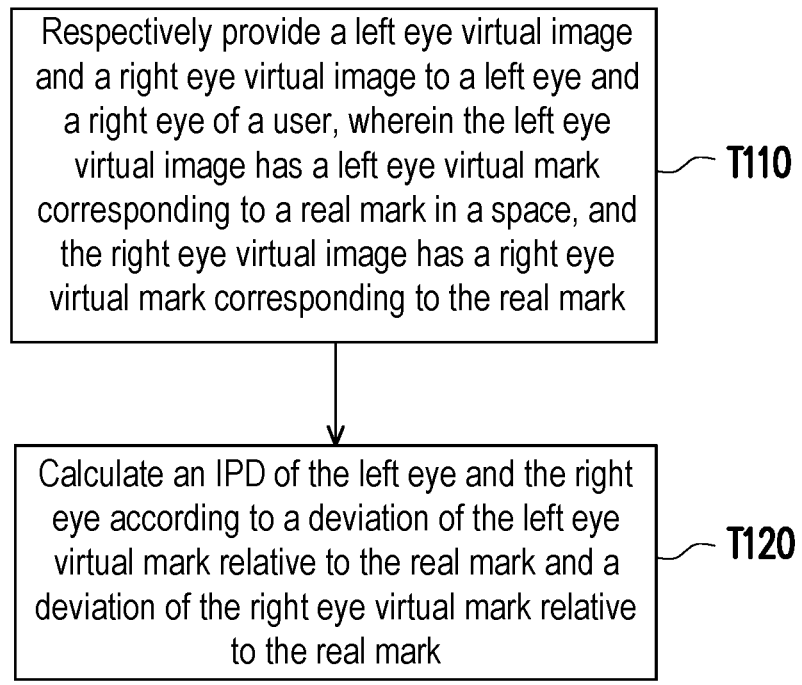
FIG. 11 is a flow chart of an augmented reality display method according to an embodiment of the disclosure.

FIG. 11 is a flow chart of an augmented reality display method according to an embodiment of the disclosure. Referring to FIG. 1, FIG. 5A to FIG. 5C, and FIG. 11, the augmented reality display method of the disclosure may be realized by adopting the augmented reality display device 100 of the various embodiments above. The method includes the following. First, step T110 is executed. The left eye virtual image 70a and the right eye virtual image 70b are respectively provided to the left eye 50a and the right eye 50b of the user. The left eye virtual image 70a has the left eye virtual mark 72a corresponding to the real mark 61 in space, and the right eye virtual image 70b has the right eye virtual mark 72b corresponding to the real mark 61. Next, step T120 is executed. The interpupillary distance of the left eye 50a and the right eye 50b is calculated according to the deviation F1 of the left eye virtual mark 72a relative to the real mark 61 and the deviation F2 of the right eye virtual mark 72b relative to the real mark 61. The details of step T110 and step T120 are described in detail in the embodiments above and therefore will not be repeated in the following.

In light of the above, in the augmented reality display device and the augmented reality display method of the embodiments of the disclosure, the left eye virtual mark and the right eye virtual mark corresponding to the real mark in space are respectively displayed in the left eye virtual image and the right eye virtual image. The interpupillary distance between the left eye and the right eye is calculated according to the deviation of the left eye virtual mark relative to the real mark and the deviation of the right eye virtual mark relative to the real mark. Accordingly, the augmented reality display device and method of the embodiments of the disclosure can calculate the interpupillary distance so as to correctly display three-dimensional images.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An augmented reality display device, comprising:
   a virtual image display configured to respectively provide a left eye virtual image and a right eye virtual image to a left eye and a right eye of a user; and
   a controller electrically connected to the virtual image display and configured to command the virtual image display to respectively display a left eye virtual mark and a right eye virtual mark corresponding to a real mark in space in the left eye virtual image and the right eye virtual image, calculate an interpupillary distance between the left eye and the right eye according to a deviation of the left eye virtual mark relative to the real mark and a deviation of the right eye virtual mark relative to the real mark, and command the virtual image display to display a correct left eye virtual image and a correct right eye virtual image according to the calculated interpupillary distance, wherein the controller is configured to calculate an viewing angle of the left eye and an viewing angle of the right eye viewing the real mark according to a number of deviated pixels of the left eye virtual mark relative to the real mark and a number of deviated pixels of the right eye virtual mark relative to the real mark and calculate the interpupillary distance according to vergence distances and the viewing angles when the left eye and the right eye view the real mark.

2. The augmented reality display device according to claim 1, wherein the controller is configured to command the virtual image display to display a scale in the left eye virtual image and the right eye virtual image so that the user enters a value of the deviation of the left eye virtual mark relative to the real mark and a value of the deviation of the right eye virtual mark relative to the real mark to the controller on his own through a user interface for the controller to calculate the interpupillary distance.

3. The augmented reality display device according to claim 1, wherein the user moves the left eye virtual mark in the left eye virtual image and the right eye virtual mark in the right eye virtual image to a position overlapping with the real mark through a user interface and the controller calculates the interpupillary distance between the left eye and the right eye according to moving distances of the left eye virtual mark and the right eye virtual mark.

4. The augmented reality display device according to claim 1, wherein the virtual image display comprises a left eye display and a right eye display configured to respectively provide the left eye virtual image and the right eye virtual image, the augmented reality display device further comprises an adjusting mechanism connected to the left eye display and the right eye display and configured to adjust a position of the left eye display and a position of the right eye display, the adjusting mechanism allows the user to move the left eye virtual mark in the left eye virtual image and the right eye virtual mark in the right eye virtual image to a position overlapping with the real mark by adjusting the position of the left eye display and the position of the right eye display, the adjusting mechanism is electrically connected to the controller, and the controller calculates the interpupillary distance between the left eye and the right eye according to moving distances of the left eye display and the right eye display.

5. The augmented reality display device according to claim 1, wherein the controller is configured to calculate a left eye viewing angle of the left eye viewing the real mark according to a number of deviated pixels of the left eye virtual mark relative to the real mark and calculate a right eye viewing angle of the right eye viewing the real mark according to a number of deviated pixels of the right eye virtual mark relative to the real mark, the controller is configured to calculate the interpupillary distance according to a distance from the left eye to the real mark, a distance from the right eye to the real mark, a distance from a midpoint between the left eye and the right eye to the real mark, the left eye viewing angle, and the right eye viewing angle, wherein the left eye viewing angle is an included angle between a line connecting the left eye and the real mark and a line connecting the midpoint and the real mark, and the right eye viewing angle is an included angle between a line connecting the right eye and the real mark and the line connecting the midpoint and the real mark.

6. The augmented reality display device according to claim 1, wherein the controller is configured to calculate a left eye viewing angle of the left eye viewing the real mark according to the number of deviated pixels of the left eye virtual mark relative to the real mark and calculate a right eye viewing angle of the right eye viewing the real mark according to the number of deviated pixels of the right eye virtual mark relative to the real mark, the controller is configured to calculate the interpupillary distance according to a distance from the left eye to the real mark, a distance from the right eye and the real mark, a perpendicular distance from the real mark to a line connecting the left eye and the right eye, the left eye viewing angle, and the right eye viewing angle, wherein the left eye viewing angle is an included angle between a line connecting the left eye and the real mark and a perpendicular line from the real mark to the line connecting the left eye and the right eye, and the right eye viewing angle is an included angle of a line connecting the right eye and the real mark and the perpendicular line.

7. The augmented reality display device according to claim 1, wherein the virtual image display comprises a left eye display, a right eye display, and two light-guiding elements, and the two light-guiding elements respectively guide an image beam emitted by the left eye display and an image beam emitted by the right eye display to the left eye and the right eye.

8. The augmented reality display device according to claim 7, wherein the left eye display and the right eye display comprise a display panel, a light valve, a lens, an illumination light source, or the combinations thereof.

9. The augmented reality display device according to claim 7, wherein each of the left eye display and the right eye display comprises an organic light-emitting diode display panel, a liquid-crystal display panel, a liquid-crystal-on-silicon panel, or a digital micro-mirror device.

10. An augmented reality display method, comprising:
respectively providing a left eye virtual image and a right eye virtual image to a left eye and a right eye of a user, wherein the left eye virtual image has a left eye virtual mark corresponding to a real mark in space, and the right eye virtual image has a right eye virtual mark corresponding to the real mark;
calculating an interpupillary distance between the left eye and the right eye according to a deviation of the left eye virtual mark relative to the real mark and a deviation of the right eye virtual mark relative to the real mark; and
displaying a correct left eye virtual image and a correct right eye virtual image according to the calculated interpupillary distance; and
calculating an viewing angle of the left eye and an viewing angle of the right eye viewing the real mark according to a number of deviated pixels of the left eye virtual mark relative to the real mark and a number of deviated pixels of the right eye virtual mark relative to the real mark; and calculating the interpupillary distance according to vergence distances and the viewing angles when the left eye and the right eye view the real mark.

11. The augmented reality display method according to claim 10, further comprising displaying a scale in the left eye virtual image and the right eye virtual image so that the user enters a value of the deviation of the left eye virtual mark relative to the real mark and a value of the deviation of the right eye virtual mark relative to the real mark to a controller on his own through a user interface for the controller to calculate the interpupillary distance.

12. The augmented reality display method according to claim 10, further comprising:
moving the left eye virtual mark in the left eye virtual image and the right eye virtual mark in the right eye virtual image to a position overlapping with the real mark through a user interface by the user; and
calculating the interpupillary distance between the left eye and the right eye according to moving distances of the left eye virtual mark and the right eye virtual mark.

13. The augmented reality display method according to claim 10, further comprising:
respectively providing the left eye virtual image and the right eye virtual image by using a left eye display and a right eye display;
adjusting a position of the left eye display and a position of the right eye display by using an adjusting mechanism connected to the left eye display and the right eye display, wherein the adjusting mechanism allows the user to move the left eye virtual mark in the left eye virtual image and the right eye virtual mark in the right eye virtual image to a position overlapping with the real mark by adjusting the position of the left eye display and the position of the right eye display; and
calculating the interpupillary distance between the left eye and the right eye according to moving distances of the left eye display and the right eye display.

14. The augmented reality display method according to claim 10, further comprising:
calculating a left eye viewing angle viewing the real mark according to a number of deviated pixels of the left eye virtual mark relative to the real mark;
calculating a right eye viewing angle viewing the real mark according to a number of deviated pixels of the right eye virtual mark relative to the real mark; and
calculating the interpupillary distance according to a distance from the left eye to the real mark, a distance from the right eye and the real mark, a distance from a midpoint between the left eye and the right eye to the real mark, the left eye viewing angle, and the right eye viewing angle, wherein the left eye viewing angle is an included angle between a line connecting the left eye and the real mark and a line connecting the midpoint and the real mark, and the right eye viewing angle is an included angle between a line connecting the right eye and the real mark and the line connecting the midpoint and the real mark.

15. The augmented reality display method according to claim 10, further comprising:
calculating a left eye viewing angle viewing the real mark according to the number of deviated pixels of the left eye virtual mark relative to the real mark;
calculating a right eye viewing angle viewing the real mark according to the number of deviated pixels of the right eye virtual mark relative to the real mark; and
calculating the interpupillary distance according to a distance from the left eye to the real mark, a distance from the right eye and the real mark, a perpendicular distance from the real mark to a line connecting the left eye and the right eye, the left eye viewing angle, and the right eye viewing angle, wherein the left eye viewing angle is an included angle between a line connecting the left eye and the real mark and a perpendicular line from the real mark and the line connecting the left eye and the right eye, and the right eye viewing angle is an included angle between a line connecting the right eye and the real mark and the perpendicular line.

16. The augmented reality display method according to claim 10, wherein the left eye virtual image and the right eye virtual image are provided by a virtual image display comprising a left eye display, a right eye display, and two light-guiding elements, and the two light-guiding elements respectively guide an image beam emitted by the left eye display and an image beam emitted by the right eye display to the left eye and the right eye.

17. The augmented reality display method according to claim 16, wherein the left eye display and the right eye display comprise a display panel, a light valve, a lens, an illumination light source, or the combinations thereof.

18. The augmented reality display method according to claim 16, wherein each of the left eye display and the right eye display comprises an organic light-emitting diode display panel, a liquid-crystal display panel, a liquid-crystal-on-silicon panel, or a digital micro-mirror device.

* * * * *